June 19, 1923.
A. KUZMANN
1,459,222
CRANKING DEVICE
Filed Jan. 17, 1922
2 Sheets-Sheet 2
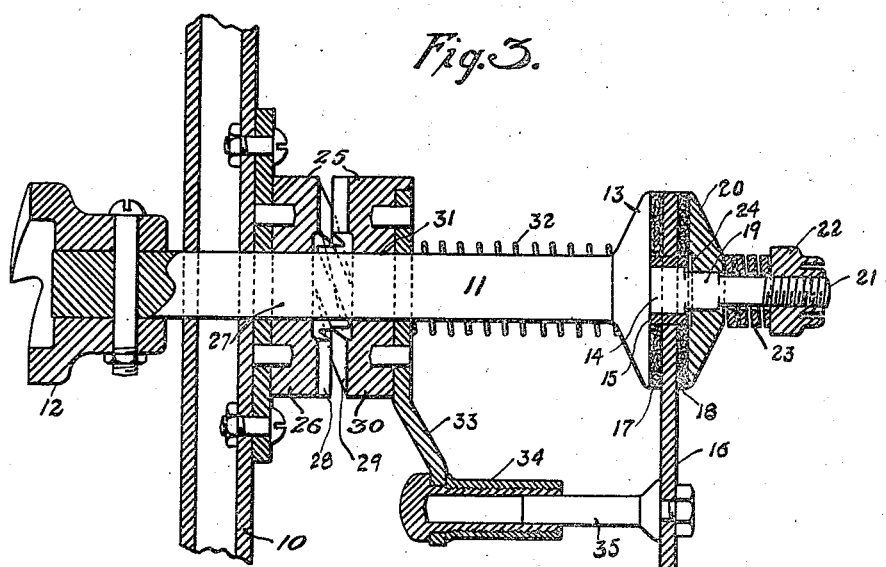
Witnesses
Frederic C. Whitney
Augustus B. Coppes
Inventor
Alexander Kuzmann
by Joshua R. H. Potts
his Attorney Patented June 19, 1923.

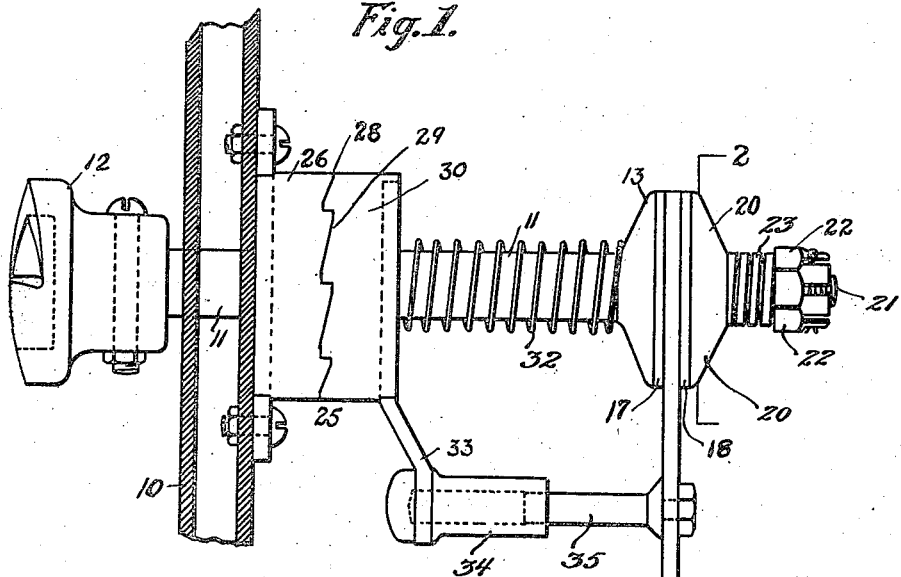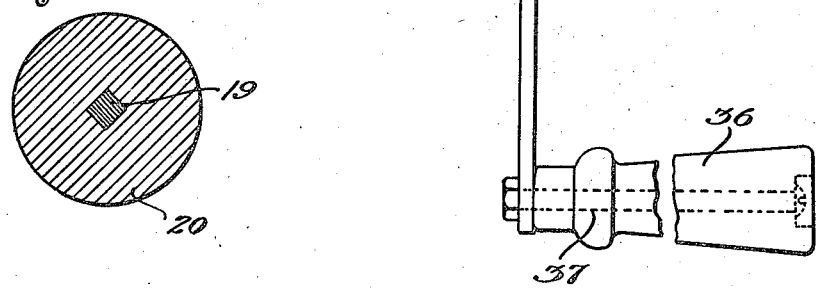

1,459,222

UNITED STATES PATENT OFFICE.

ALEXANDER KUZMANN, OF PHILADELPHIA, PENNSYLVANIA.

CRANKING DEVICE.

Application filed January 17, 1922. Serial No. 529,863.

*To all whom it may concern:*

Be it known that I, ALEXANDER KUZMANN, a citizen of the United States, residing at Philadelphia, in the county of Philadelphia and State of Pennsylvania, have invented certain new and useful Improvements in Cranking Devices, of which the following is a specification.

One object of my invention is to provide a device which can be conveniently and safely used for cranking automobile internal combustion engines; the arrangement and construction being such that if, during the cranking of the engine, the crank shaft suddenly turns in a reverse direction under the power of the engine either due to back fire or other reasons, a part of said device will lock the operating crank thereof against rotation and thereby prevent injury to the operator.

Another object is to make my improved device of a strong and comparatively simple construction.

These objects, and other advantageous ends which will be described hereinafter, I attain in the following manner, reference being had to the accompanying drawings, in which—

Figure 1 is a top plan view showing my improved device used in the capacity of a cranking device for an automobile engine, Figure 2 is a section taken on the line 2—2 of Figure 1, Figure 3 is a sectional plan view of said device showing the arrangement of the parts during the cranking action, and Figures 4 and 5 are perspective views of certain of the parts of my improved device.

Referring to the drawings, 10 represents a portion of a supporting rail such for example as a portion of the rail of an automobile frame; said rail having a spindle shaft 11 freely rotatable therein; said rail serving as a support or bearing for said spindle; it being noted that said spindle shaft is capable of rotating and moving in the direction of its length through said rail. The spindle shaft 11 has a crank clutch part 12 thereon adapted to co-act with another part (not illustrated) on the crank shaft of the automobile of which the rail 10 is a part and it will be noted that when the clutch part 12 is rotated in one direction that it will serve to crank the engine for the purpose of starting the same.

The spindle shaft 11 at a position opposed to the clutch part 12 has a head or enlargement 13 and projecting beyond this head 13, the spindle shaft 11 has a cylindrical stem portion 14 around which is positioned a collar 15 preferably of fiber or other friction producing material. A cranking arm or lever 16 has a hole through which the collar 15 extends. Two friction disk rings 17 and 18 have holes through which the collar 15 passes and these rings are positioned one at each side of the cranking lever 16. The stem portion 14 of the spindle shaft 11 has a projecting part 19 which is angular in cross section and on this portion 19 is positioned a pressure ring 20 preferably of metal and having an angular hole in which the part 19 fits. From the portion 19 projects an integral stem 21 which adjacent its outer end is screw threaded to allow a nut 22 to be screwed thereon and a friction producing spring 23 is interposed between the nut 22 and the pressure ring 20; this spring 23 surrounding the stem 21.

The pressure ring 20 preferably has a recess 24 in its inner face of a diameter slightly larger than the outer diameter of the collar 15 so that when the parts are new the outer end of the collar is slightly spaced from the pressure ring 20 as clearly shown in Figure 3. A locking clutch 25 has a part 26 which is secured to the rail 10; said part 26 having a hole 27 through which the spindle shaft 11 freely passes. This part 26 of the clutch 25 has clutch teeth 28 adapted under certain conditions to mesh with clutch teeth 29 on a part 30 of the clutch 25. This part 30 is freely supported on the spindle shaft 11 and has a hole 31 through which the spindle shaft 11 freely extends. A coil spring 32 surrounds the spindle shaft 11 and has its opposite ends abutting the portion 30 of the clutch 25 and the head 13 of the shaft 11 so that said spring 32 tends to move the part 30 of the locking clutch 25 into locking engagement with the part 26 of the clutch 25. The teeth 28 and 29 of the locking clutch parts have beveled or angular portions which, when the part 30 is rotated in one direction, cause said part 30 to be moved toward the head 13 of the spindle shaft against the action of the spring 32; this action occurring in a manner hereinafter described, when the crank lever 16 is being turned in a direction to crank the engine.

The locking clutch part 30 has an extension 33 which carries a sleeve housing 34 into which a plunger coupling pin 35 telescopically engages. This plunger coupling pin 35 is secured to the cranking lever 16.

The crank lever 16 is provided with a handle 36 extending at an angle outwardly therefrom; said handle preferable being rotatably mounted on a bolt 37 which is secured to the outer end of the crank lever.

During the action of the device, in cranking an engine the crank lever 16 is turned clockwise and the spindle shaft 11 is turned clockwise due to the friction interposed between the crank lever 16 and the shaft by the provision of the friction disk rings 17 and 18 and collar 15. This friction can be made sufficient to prevent slipping of the cranking lever relatively to the spindle shaft 11 by tightening on the nut 22 and during such rotation of the spindle shaft, the cranking clutch part 12 will be rotated and the locking clutch part 30 will be rotated due to the slidable connection between the sleeve housing 14 and the plunger coupling pin 35. This rotatable action of the clutch part 30 will cause it to move lengthwise on the shaft 11 toward the head 18 against the tension of the spring 32. If, however, for any reason whatever the part 12 of the cranking lever rotates under the power of the engine in an opposite direction, said movement will be imparted to the spindle shaft 11 and crank lever 16 and the locking clutch part 30 will be rotated in an opposite direction and the spring 32 will move said clutch part 30 with its teeth into locking engagement with the teeth of the part 26 of the locking clutch 25 and since the part 26 is rigidly secured to the frame rail 10, the rotation of the crank lever 16 will be stopped; thereby preventing injury to the operator and any further movement of the spindle shaft 11 in said latter direction will merely overcome the friction between the disk rings 17 and 18 and collar 15 with the crank lever 16. Thus the arm of the operator will be saved against injury.

While I have described by improved device for use in connection with an internal combustion engine for the purpose of cranking the same, it will be understood that said device can be used with advantage in any instance where there is a possibility of a backlash during the rotation of the spindle shaft and furthermore my device can be used in any instance where it is desirable not to overwind a part since if the resistance to the spindle shaft is greater than the friction exerted between the spindle shaft and the crank lever, the crank lever will merely rotate independently of the spindle shaft if such greater resistance is imparted to the spindle shaft during the operation of the device.

When wear occurs between the friction disk rings the nut 22 can be tightened to compensate for the wear.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a spindle shaft; a relatively fixed supporting structure; a lever; friction connecting means between said lever and said spindle shaft; and a locking clutch having parts respectively connected to said supporting structure and to said lever, and means disposed between said lever and the adjacent clutch part to move said clutch parts relatively to each other out of locking engagement when the lever is moved in one direction and to move said parts into locking engagement when said lever moves in an opposite direction; substantially as described.

2. A device of the character described including a spindle shaft; a relatively fixed supporting structure; a lever; friction connecting means between said lever and said spindle shaft; a locking clutch having parts provided with locking teeth, one of said parts being secured to said supporting structure, the other of said parts being slidably mounted on said spindle shaft; a spring disposed between said lever and the slidable clutch part for moving said latter part with its teeth in locking engagement with the teeth of the other part; and means providing a telescoping connection between said second mentioned clutch part and said lever; substantially as described.

3. A device of the character described including a spindle shaft; a relatively fixed supporting structure; a lever; friction connecting means between said lever and said spindle shaft; a locking clutch having parts provided with locking teeth, one of said parts being secured to said supporting structure, the other of said parts being slidably mounted on said spindle shaft; a spring disposed between said lever and the slidable clutch part for moving said latter part with its teeth in locking engagement with the teeth of the other part; and means providing a telescoping connection between said second mentioned clutch part and said lever, said teeth of the clutch parts having slanting portions for causing the separation of the clutch parts when said lever is moved in said first direction; substantially as described.

4. A device of the character described including a spindle shaft having an enlargement and a portion projecting beyond said enlargement; a friction collar on said latter portion and abutting said enlargement; a lever rotatably mounted on said collar; friction means interposed between said lever and said enlargement of the shaft; means for compressing said friction means between the lever and said enlargement; a relatively fixed supporting structure; a clutch part mounted on said supporting structure; another clutch part slidably mounted on said shaft and adapted to engage said first clutch part; resilient means disposed between said second mentioned clutch part and said enlargement; and a slidable connection between said last mentioned clutch part and said lever; substantially as described.

5. A device of the character described including a spindle shaft; a relatively fixed supporting structure; a lever; a locking clutch having one portion connected to said supporting structure and the other portion slidably mounted on said shaft; means disposed between said last mentioned clutch member and said lever for normally urging the same to engaging position; and a slidable connection between said last mentioned clutch member and said lever; substantially as described.

6. A device of the character described including a spindle shaft; a relatively fixed supporting structure; a lever; a clutch having one part mounted on said fixed supporting structure, and the other part slidably mounted on said shaft; means disposed between said lever and said last mentioned clutch part for normally urging the same to operative position; an extension on said last mentioned clutch part; and a telescopic connection between said extension and said lever; substantially as described.

7. A device of the character described including a rotatable longitudinally movable spindle shaft; a relatively fixed structure; a lever; a clutch part mounted on said fixed structure and another clutch part slidably mounted on said shaft; resilient means disposed between said lever and said last mentioned clutch part; and a slidable connection between said last mentioned clutch part and said lever.

In testimony whereof I have signed my name to this specification in the presence of two subscribing witnesses.

ALEXANDER KUZMANN.

Witnesses:
    CHAS. E. POTTS,
    ELIZABETH GARBE.